(12) United States Patent
Harrison

(10) Patent No.: US 7,059,666 B2
(45) Date of Patent: Jun. 13, 2006

(54) MULTI-ACCESS TRUCK BED

(76) Inventor: Joel Harrison, 1104 Wagon Wheel Ct., Berthoud, CO (US) 80513

( * ) Notice: Subject to any disclaimer, the term of this patent is extended or adjusted under 35 U.S.C. 154(b) by 0 days.

(21) Appl. No.: 10/864,720

(22) Filed: Jun. 9, 2004

(65) Prior Publication Data
US 2005/0275245 A1 Dec. 15, 2005

(51) Int. Cl.
*B62D 33/03* (2006.01)
(52) U.S. Cl. .................. 296/186.4; 296/36; 296/26.15
(58) Field of Classification Search .................. 296/32, 296/36, 26.15, 57.1, 183.1, 186.4
See application file for complete search history.

(56) References Cited

U.S. PATENT DOCUMENTS

| | | | |
|---|---|---|---|
| 3,768,858 A * | 10/1973 | Boismier | 296/100.09 |
| 3,836,769 A | 9/1974 | Wilson | 296/10 |
| 3,884,526 A | 5/1975 | Sweet et al. | 298/1 A |
| 4,678,391 A | 7/1987 | Mooney | 414/389 |
| 4,695,087 A | 9/1987 | Hollrock | 296/14 |
| 5,340,266 A | 8/1994 | Hodgetts | 414/527 |
| 5,511,848 A | 4/1996 | Mobley | 296/183 |
| 5,743,589 A * | 4/1998 | Felker | 296/180.5 |
| 5,810,415 A | 9/1998 | Vogel | 296/39.1 |
| 6,065,792 A | 5/2000 | Sciullo et al. | 296/26.09 |
| 6,644,708 B1 * | 11/2003 | Grzegorzewski et al. | 296/32 |
| 2005/0057073 A1 * | 3/2005 | Hunt | 296/183.1 |
| 2005/0093339 A1 * | 5/2005 | Klassen | 296/183.1 |

FOREIGN PATENT DOCUMENTS

GB 2177658 * 1/1987 .................. 296/36

* cited by examiner

*Primary Examiner*—Dennis H. Pedder
(74) *Attorney, Agent, or Firm*—Starkweather & Associates; Michael W. Starkweather; Jason P. Webb

(57) ABSTRACT

A cargo bed with multiple access points. The cargo bed comprises a front member, a back member, a cargo floor, and a pair of side members that move to allow access to the cargo floor from nearly all sides so as to allow a member access to the cargo floor from the sides of the cargo bed. The side members may rotate about an axis horizontal to the cargo floor, roll on a set of rails with an axis vertical to the cargo floor, open about an axis vertical to the cargo floor, or be removable. The cargo bed may further comprise receiving beams for receiving the side members and holding them in a closed position, or the receiving beams may be integrally built into the front, back, or side members.

8 Claims, 10 Drawing Sheets

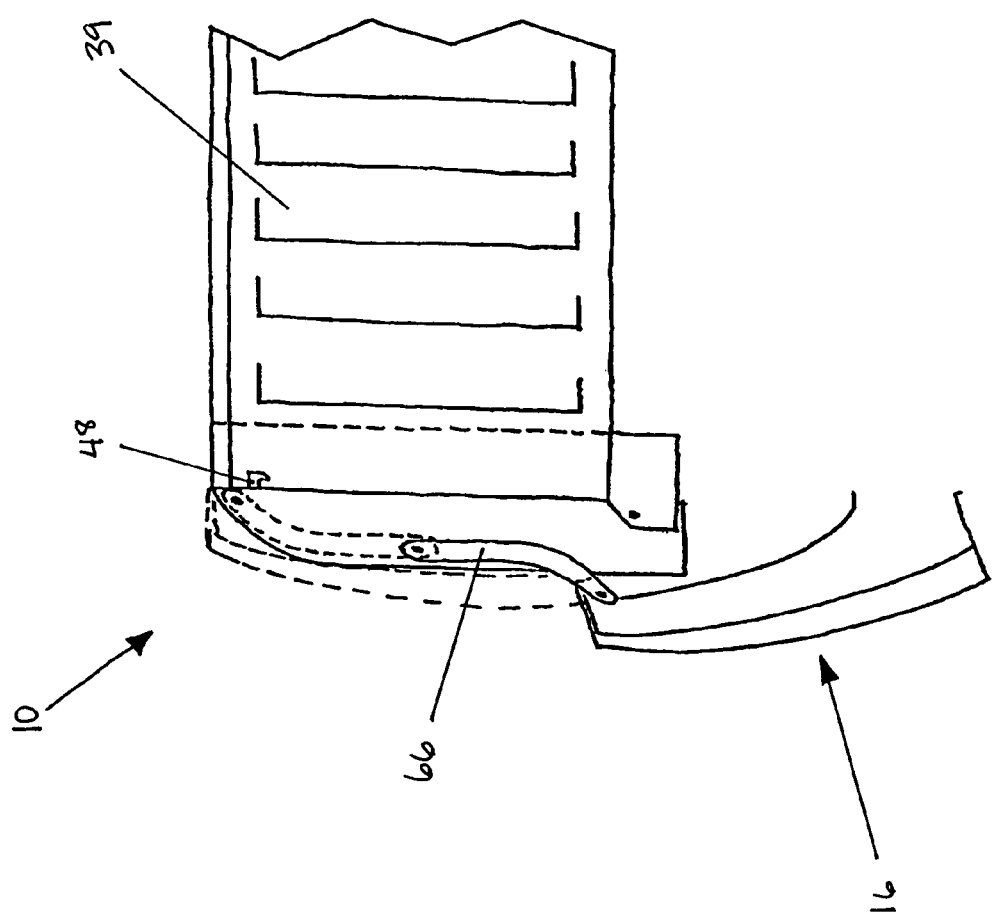

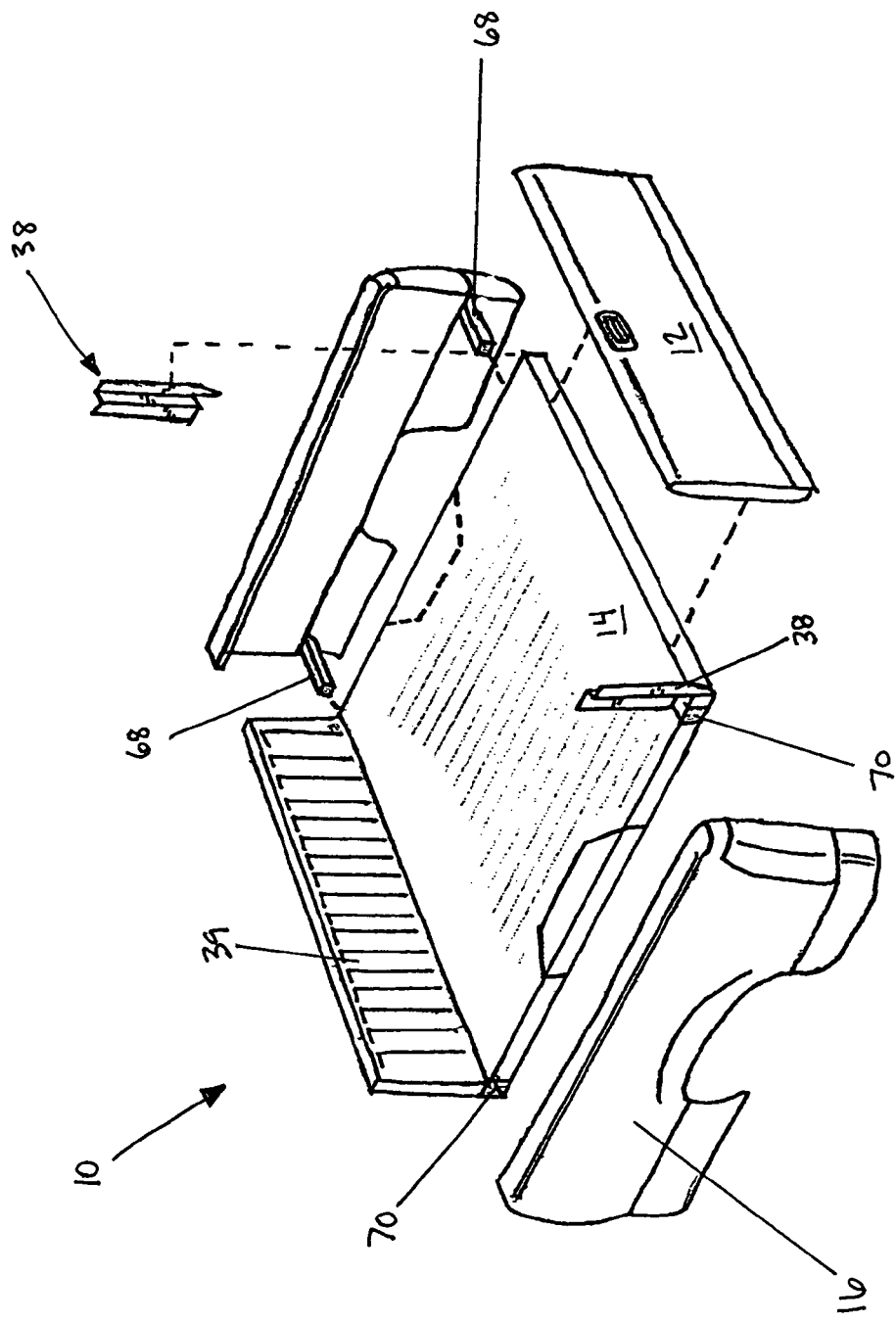

MULTI-ACCESS TRUCK BED

BACKGROUND OF THE INVENTION

1. The Field of the Invention

This invention relates to cargo beds for trucks, and the like. More particularly this invention relates to a truck bed with multiple access points, including on the sides.

2. The Relevant Art

Utility vehicles, such as pickup trucks and cargo vans, are characterized by a load carrying portion, referred to as a cargo bed, defined by a generally planar cargo floor, side members that run perpendicular to the floor, a back member, and a front member that folds down for access to the cargo floor. The dimensions of the cargo bed vary in length from several feet to more than eight feet. These types of vehicles are multifunctional, since they satisfy both transportation and load carrying capacity needs.

Although cargo beds include the front member folding feature for easier access to the cargo floor, often times the front member is not utilized, or often times the objects being loaded into the cargo bed may not enter through the front member when the front member is open. As a result, objects are thrown over one of the side members into the cargo bed. Likewise, rather than lowering the front member to remove the objects, people reach over the side members to grab the objects. As the people reach over the side members, the painted areas of the cargo bed become scratched, and the side members dent and wear disproportionate to the rest of the vehicle. The cargo bed begins to look overly abused. Similarly, because it is more difficult to place and remove objects into the cargo bed from the side members, the objects are more likely to become damaged.

Thus, it can be clearly recognized that there is a need for a cargo bed that facilitates placement and removal of various objects from multiple areas of the cargo bed. Specifically, there is a need for a cargo bed that allows the side members, in addition to the front member, to fold down, tilt, rotate, or open so that people can place and access objects positioned on the cargo floor.

SUMMARY OF THE INVENTION

The various elements of the present invention have been developed in response to the present state of the art, and in particular, in response to the problems and needs in the art that have not yet been fully solved by currently available cargo beds. Accordingly, the present invention provides a cargo bed with side members that move to allow access to the cargo floor from nearly all sides.

More particularly, the present invention provides a cargo bed with a cargo floor, two side members, a back member, and a front member, wherein the side members are configured to move so as to allow a user access to the cargo floor from the sides of the cargo bed. The side members may rotate about an axis horizontal to the cargo floor, roll on a set of rails vertical to the cargo floor, open about an axis vertical to the cargo floor, or be entirely removable. The cargo bed may further comprise receiving beams that extend substantially perpendicular to the cargo floor, or the receiving beams may be integrally built into the front, back, or side members. The receiving beams are configured to hold the side members in a closed position.

Additional features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 illustrates a rear view of a cargo bed with a side member moved into an open position according to one embodiment of the present invention; and FIG. 10 illustrates an exploded view of a cargo bed with removable members according to one embodiment of the present invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
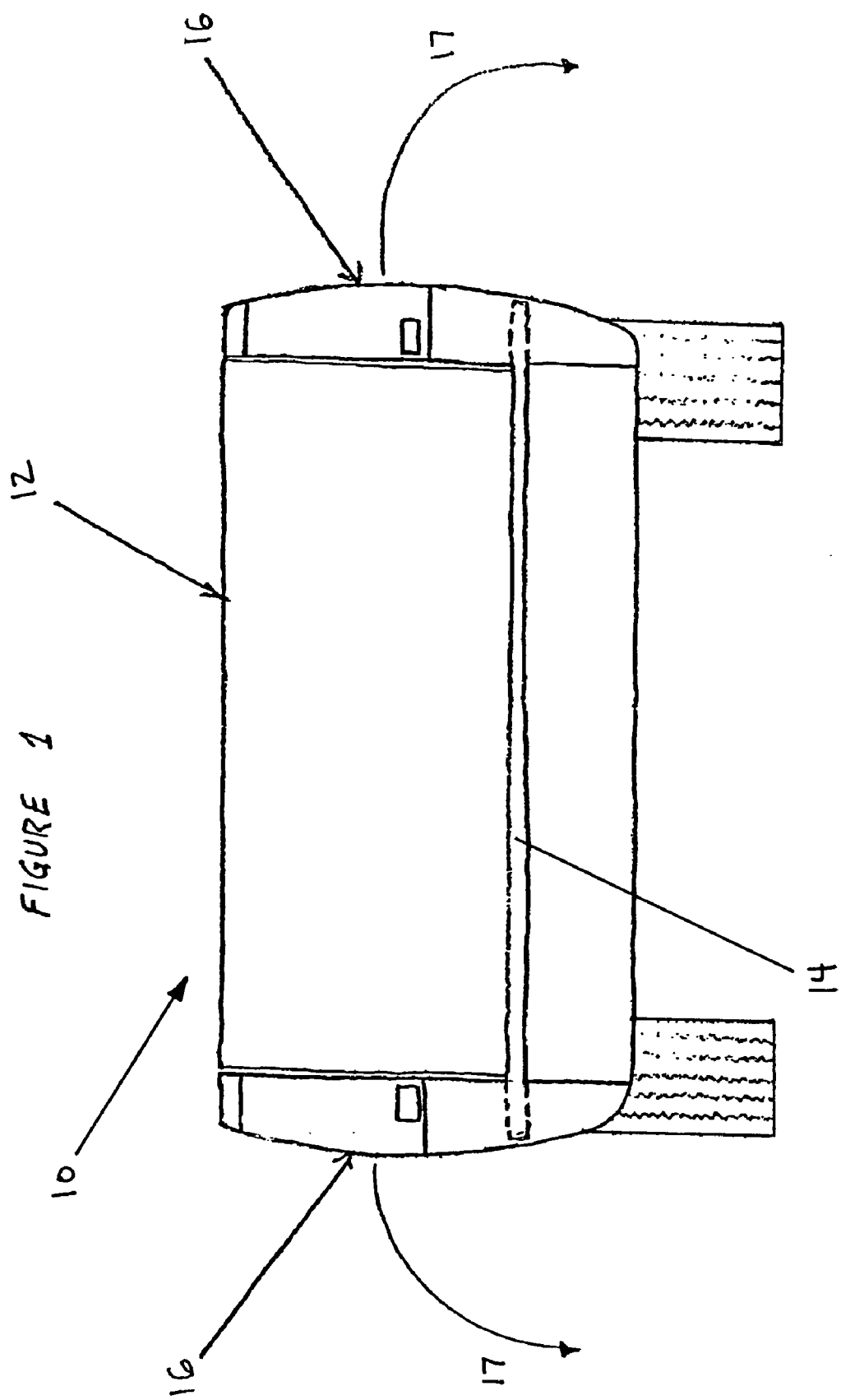
FIG. 1 illustrates a rear view of a vehicle with a typical cargo bed according to one embodiment of the present invention.
Figure 2:
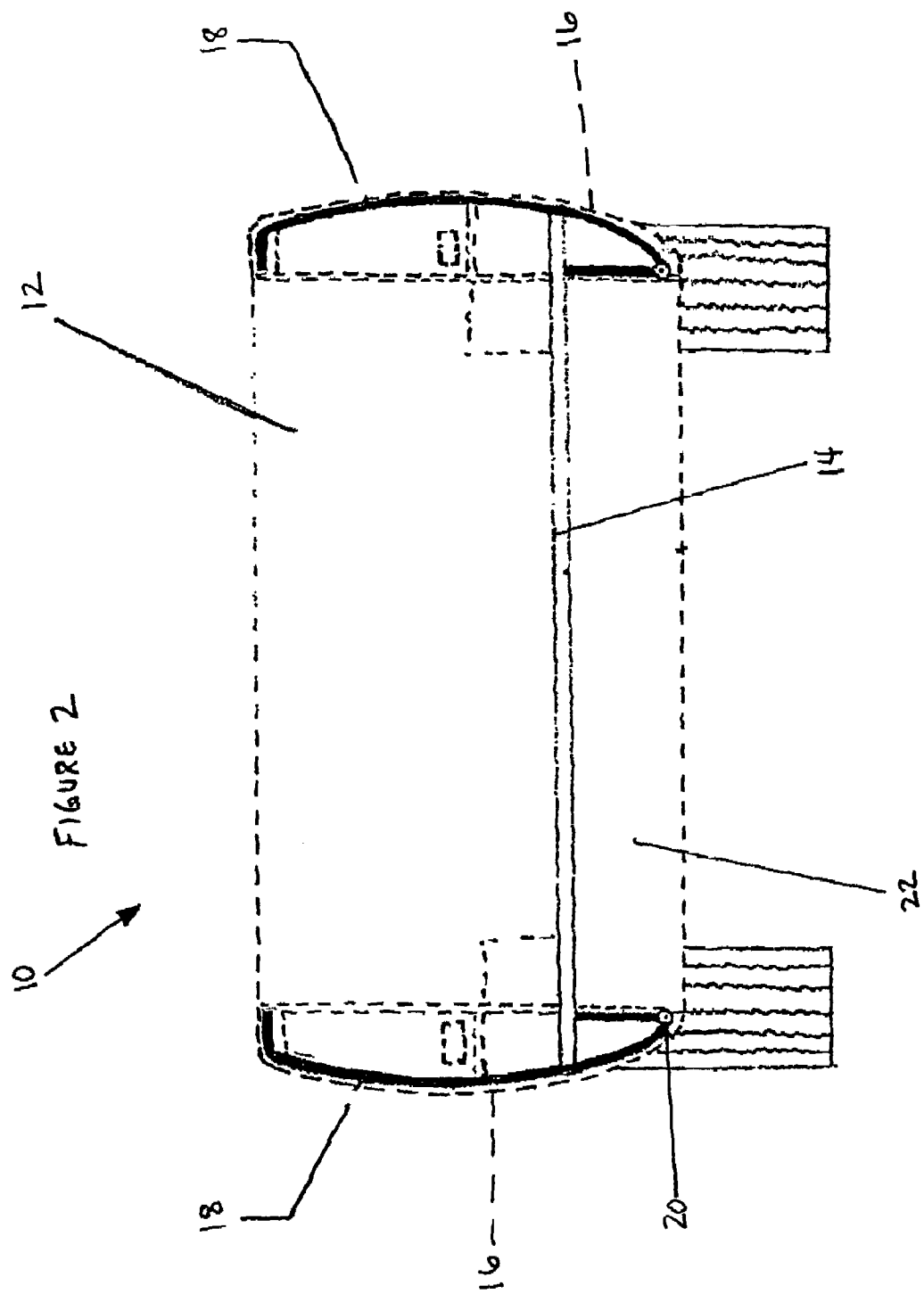
FIG. 2 illustrates a rear exploratory view of a vehicle with a cargo bed according to one embodiment of the present invention.

FIGS. 1 and 2 illustrate rear views of a vehicle with a cargo bed 10 according to one embodiment of the present invention. The cargo bed 10 comprises a front member, or tailgate, 12, a cargo floor 14, and a pair of side members, or bed sides, 16. The front member 12 and side members 16 attach perpendicular to the cargo floor 14. The front member 12 is configured to open about a pivot point (not shown) near the cargo floor 14. With the front member 12 in an open position, a user can insert objects into the cargo bed 10. In contrast, with the front member 12 closed, the cargo bed 10 is configured to hold an object within an area confined by the cargo bed 10. The side members 16 are configured to open in the direction of arrow 17.

Referring to FIG. 2, in one embodiment, the side members 16 comprise support arms 18 embedded within the side members 16 for providing support and maintaining structural integrity to the side members 16. Additionally, the support arms 18 include pivot points 20 which connect the side members 16 to a roll pan, or hinge support, 22 of the cargo bed 10. In one embodiment, the pivot points 20 are hinges, which may be any length, and the side members 16 may comprise a plurality of hinges to connect the side members 16 to the roll pan 22.

Figure 3:
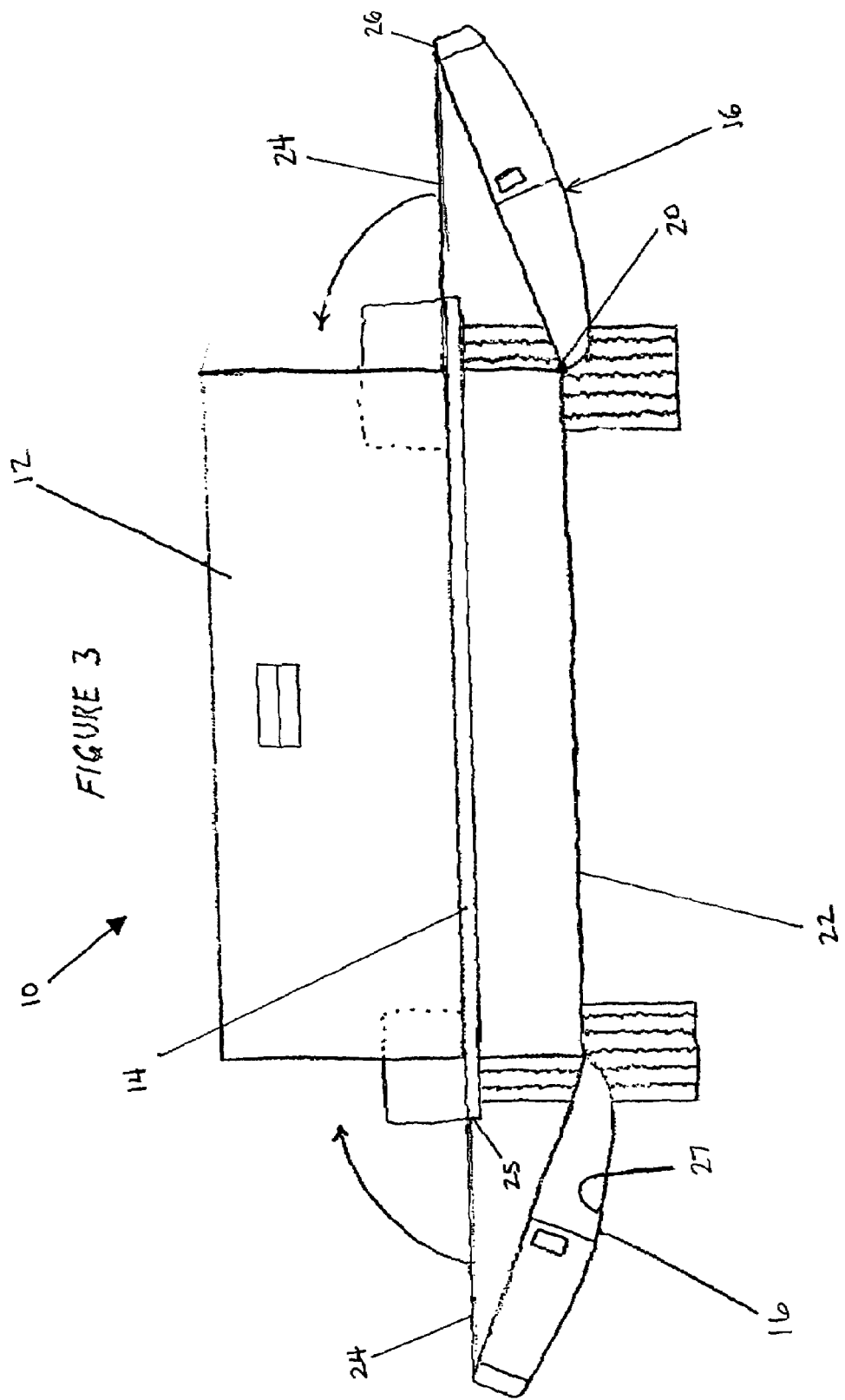
FIG. 3 illustrates a rear view of a vehicle with a cargo bed having side members folded into open positions according to one embodiment of the present invention.

FIG. 3 illustrates a rear view of a cargo bed 10 with the side members 16 folded into the open position according to one embodiment of the present invention. In this embodiment, the side members 16 connect to the roll pan 22 at the pivot points 20 and may be supported by a support member 24 to prevent the side members 16 from contacting the ground. Additionally, the support members 24 may be configured to maintain a top edge 26 of the side members 16 level with the cargo floor 14. In one embodiment, the support members 24 are cables. In other embodiments, the support members 24 may be metal hinges that fold or slide, metal rods, straps, springs, pneumatics, etc. to allow the side members 16 the ability to move into the open and closed positions.

In one embodiment, the support members 24 are rigid metal liners hingably connected to the top inner edge 26 of the side member 16. Specifically, the inner metal liner may be hingedly attached to the top inner edge 26 of the side members 16 and include a hook (not shown) at a lower edge of the metal liner that attaches to the cargo floor 14. In operation, as the side members 16 move into the open position, the hook of the metal liner couples a receiving hole (not shown) on an outer edge of the cargo floor 14. As the side members 16 move into a closed position, the hook of the metal liner regresses from within the receiving hole on the cargo floor 14. The inner metal liner provides the added benefit of additional surface area for resting objects that are to be placed into the cargo bed 10. Well known opening/closing mechanisms may be used to disengage/engage the side members 16 to move the side members 16 into open and closed positions.

The support members 24 may be connected to any point on the side member 16 and any point on the cargo bed 10. For example, the support member 24 may be attached to a side edge 25 of the cargo floor 14 and to an inner side 27 of the side member 16. Similarly, the support member 24 may attach on one end to the roll pan 22 and the other end to the inner side 27 of the side member 16 or along the top inner edge 26. One skilled in the art will recognize that there are innumerable ways for connecting the support members 24 to the side members 16.

Figure 4:
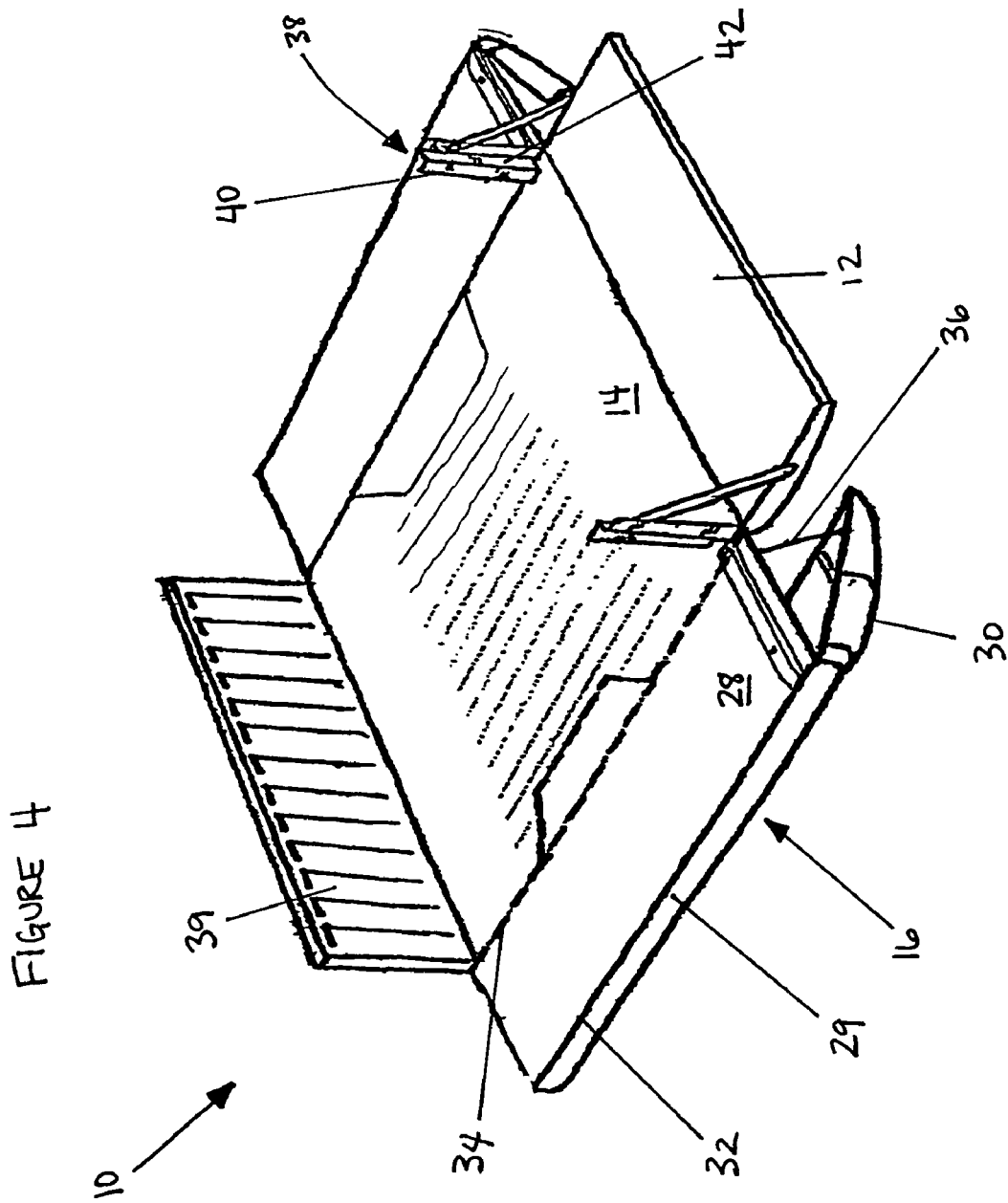
FIG. 4 illustrates a top perspective view of a vehicle with a cargo bed having side members and front member folded into an open position according to one embodiment of the present invention.

FIG. 4 illustrates a top perspective view of a cargo bed 10 having the side members 16 and the front member 12 folded into the open position according to one embodiment of the present invention. The side members 16 comprise an inner side 28 and an outer side 30, which pivotally connect at a top edge 29 of the side member 16 at a hinge 32 or other similar pivot point. Additionally, the inner side 28 pivotally connects to the cargo floor 14 at a hinge 34. The hinge 34 allows the side members 16 to fold into the open position.

In one embodiment, the outer sides 30 of the side members 16 are configured to rotate away from the inner sides 28 to prevent the outer sides 30 from contacting components of the vehicle as the side members 16 fold into the open position. A connecting member 36, such as a rod, cable, strap, link, etc., may be used to restrain the outer portion 30 from contacting the ground and becoming damaged. One skilled in the art will recognize that there are many methods and devices for preventing the outer side 30 from becoming damaged when the side member 16 is in the open position.

As the side members 16 fold into the closed position, the outer side 30 rotates toward the inner side 28. The outer side 30 may secure to the inner side 28 via a clamp, clasp, latch, plug, plunger, etc. One skilled in the art will recognize that there are many methods and devices for attaching the outer side 30 to the inner side 28.

In the closed position, the side member 16 engages a receiving beam 38 that extends perpendicular from the cargo floor 14. The receiving beam 38 comprises a side member receiving section 40 configured to receive and retain the side member 16 in the closed position, and a front member receiving section 42 configured to receive and retain the front member 12 in the closed position. In one embodiment, the receiving beam 38 is fully integrated into the side members 16, the front member 12, or the back member 39. In another embodiment, the cargo bed 10 may comprise additional receiving beams 38 at a back member 39 of the cargo bed 10, or the side member 16 may attach directly to the back member 39.

Figure 5:
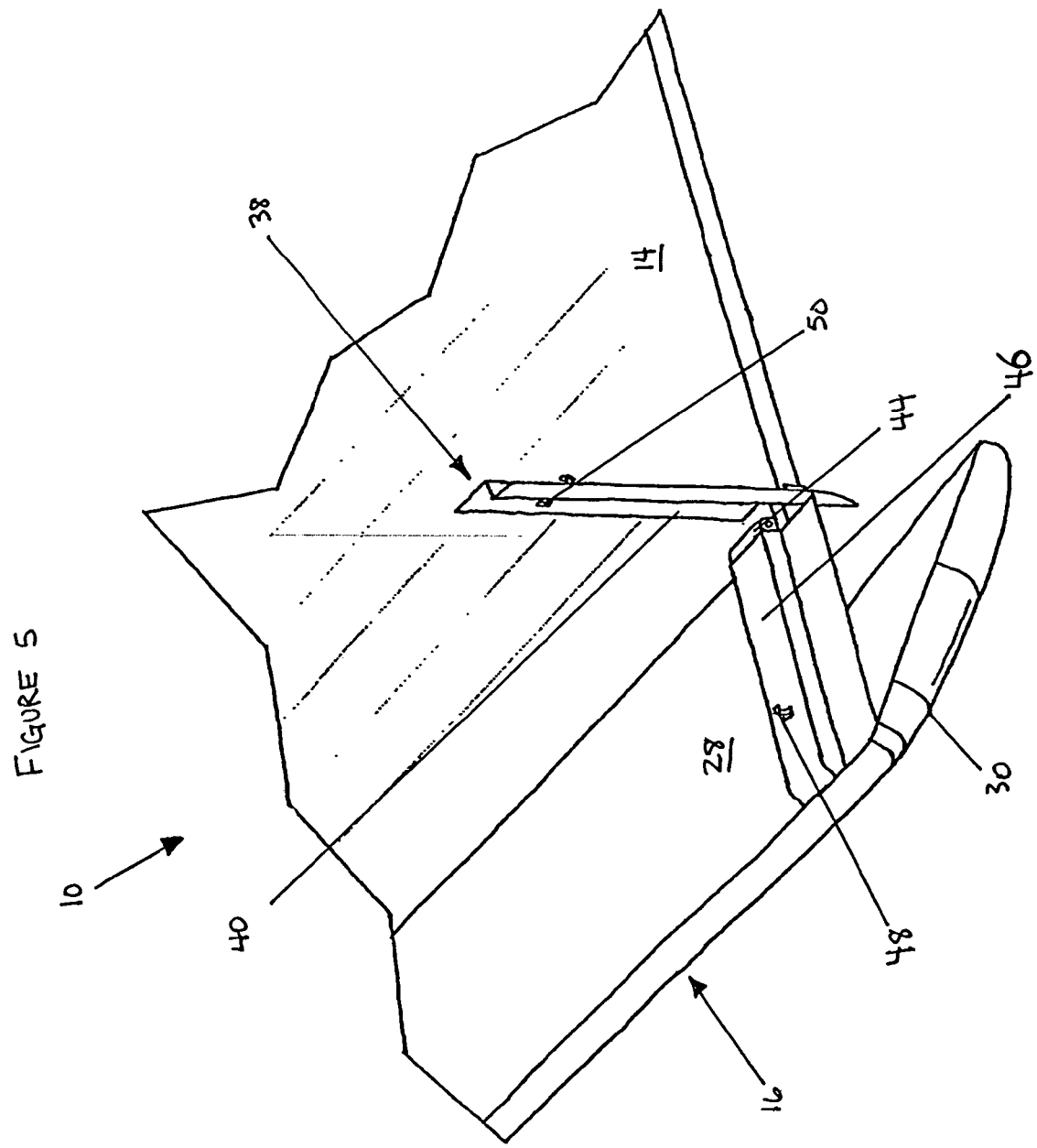
FIG. 5 illustrates a cut-away section of a cargo bed showing one embodiment of a hinge for folding a side member according to one embodiment of the present invention.
Figure 6:
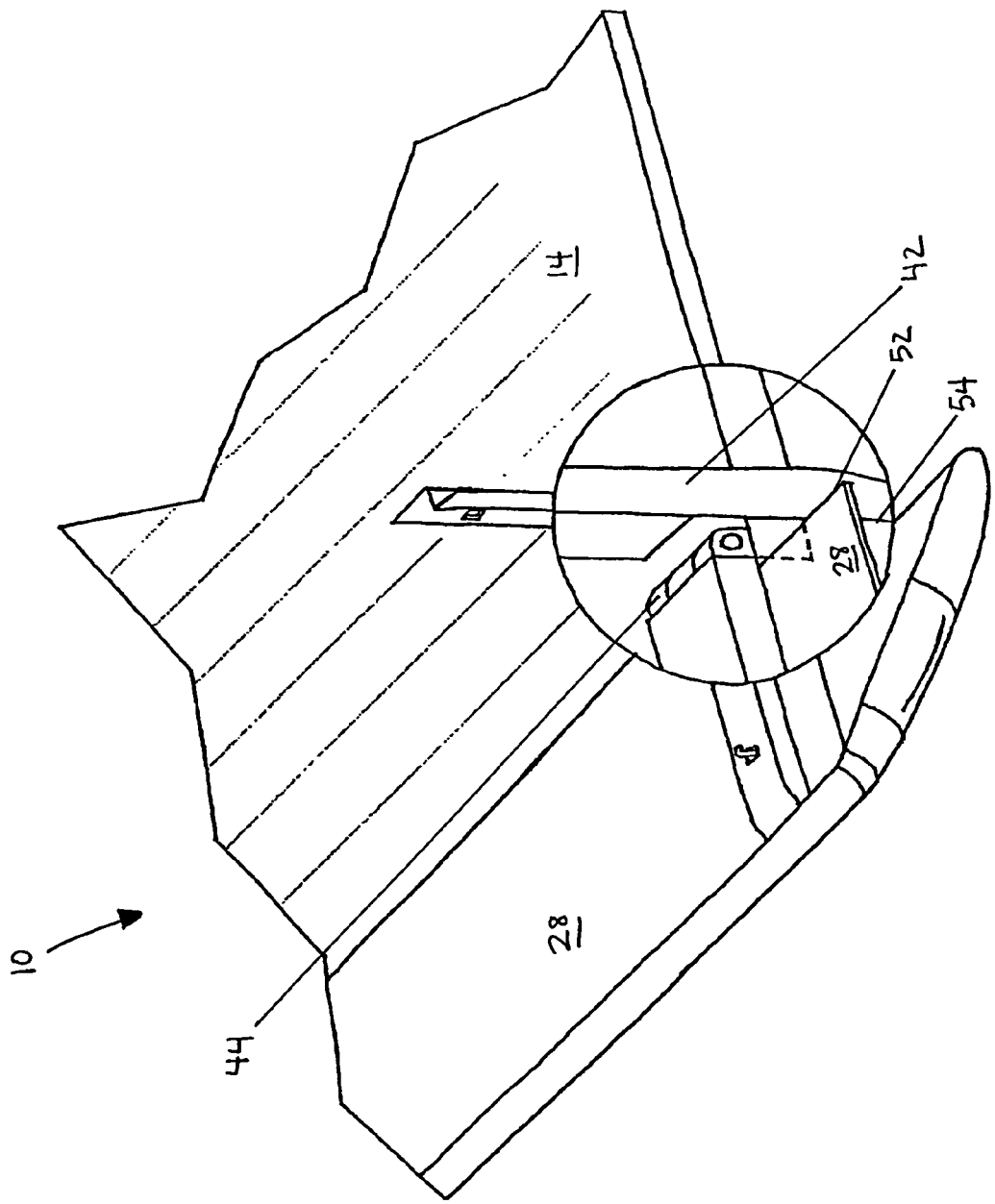
FIG. 6 illustrates a close-up view of a hinge for connecting a side member to a cargo bed floor according to one embodiment of the present invention.

FIGS. 5 and 6 illustrate cut-away sections of the cargo bed 10 showing a hinge 44 for folding a side member 16 into the open and closed positions according to one embodiment of the present invention. The inner side 28 connects to a hinge member 46, which connects to the hinge 44. The hinge 44 enables the side member 16 to open and close. In the closed position, the hinge member 46 folds into the side member receiving section 40 and a latch 48 engages a latch hole 50 on the side member receiving section 40 of the receiving beam 38 to retain the side member 16. The latch 48 may disengage from the latch hole 50 via a handle (not shown) or a button (not shown) configured into the side member 16. One skilled in the art will recognize that there are numerous types of latches and fastening devices for engaging and disengaging the side members 16 and the front member 12 (See FIG. 4) to each other.

In one embodiment, a bottom edge 52 of the inner side 28 of the side member 16 maintains the inner side 28 of the side member 16 parallel to the cargo floor 14 by contacting an outer edge 54 of the front member receiving section 42. In another embodiment, the hinge 44 is configured to rotate approximately 90 degrees to maintain the inner side 28 of the side member 16 parallel to the cargo floor 14. In yet another embodiment, a cable, or strap (not shown) maintains the side member 16 parallel to the cargo floor 14. One skilled in the art will recognize that there are numerous methods and devices for maintaining the side member 16 parallel to the cargo floor 14. It is noted that maintaining the side member 16 parallel to the cargo floor 14 is advantageous for providing additional surfaces for loading objects into the cargo bed, however, maintaining the side member 16 parallel to the cargo floor 14 is not necessary. Rather, the hinge 44 may be configured to allow the side member 16 to rotate more than 90 degrees from the closed position.

Figure 7:
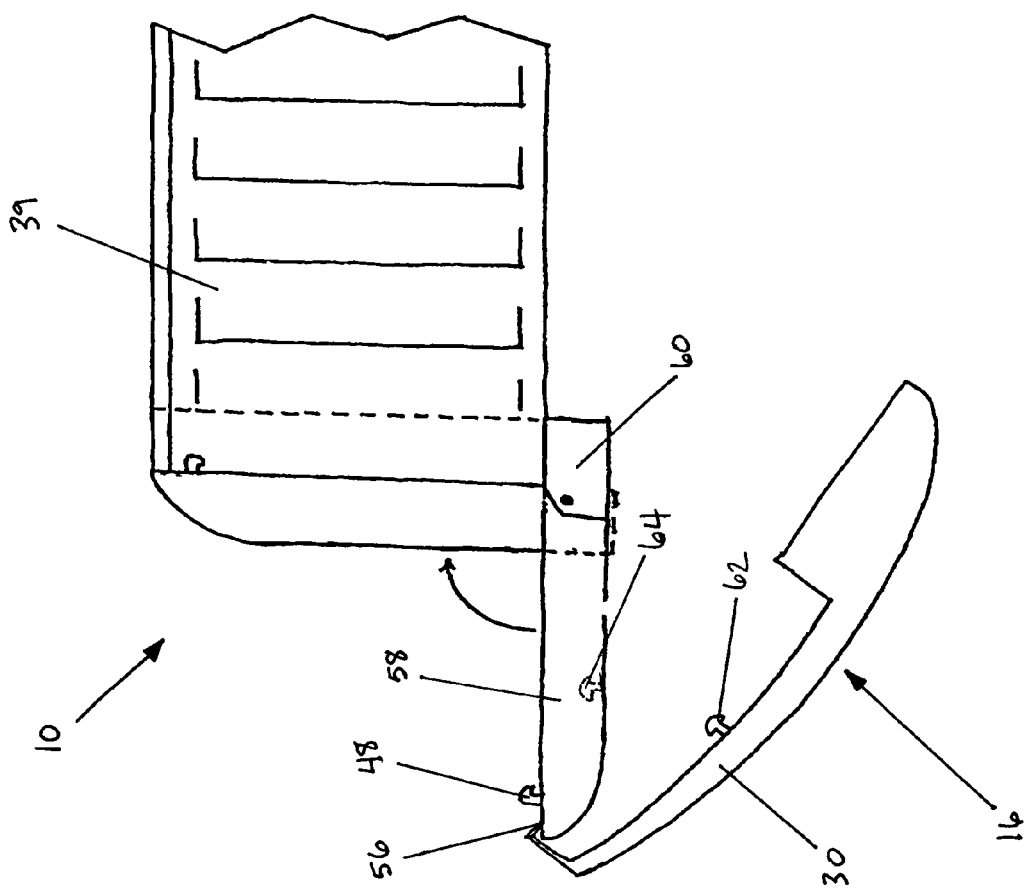
FIG. 7 illustrates a rear view of a cargo bed with a side member folded into an open position according to one embodiment of the present invention.

FIG. 7 illustrates a side cross-sectional view of the cargo bed 10 with the side member 16 folded into the open position according to one embodiment of the present invention. The outer side 30 pivotally attaches to an upper edge 56 of a pivot arm 58. The outer side 30 is configured to rotate away from the pivot arm 58 as the side member 16 rotates to the open position to prevent the outer side 30 from contacting components underneath the cargo bed 10, such as a connecting hinge 60. The latch 48 removably couples the pivot arm 58 to the front member 12 (See FIG. 4) and the back plate 39.

A plunger 62 and plunger receiver 64 may be used to couple the outer side 30 to the pivot arm 58. Specifically, when the side member 16 is in the closed position, the plunger 62 enters the plunger receiver 64 to prevent the outer side 30 from moving. However, as discussed above, there are numerous methods and devices that may be used to couple the outer side 30 to the pivot arm 58, including rods, straps, rope, clamps, clasps, etc.

Figure 8:
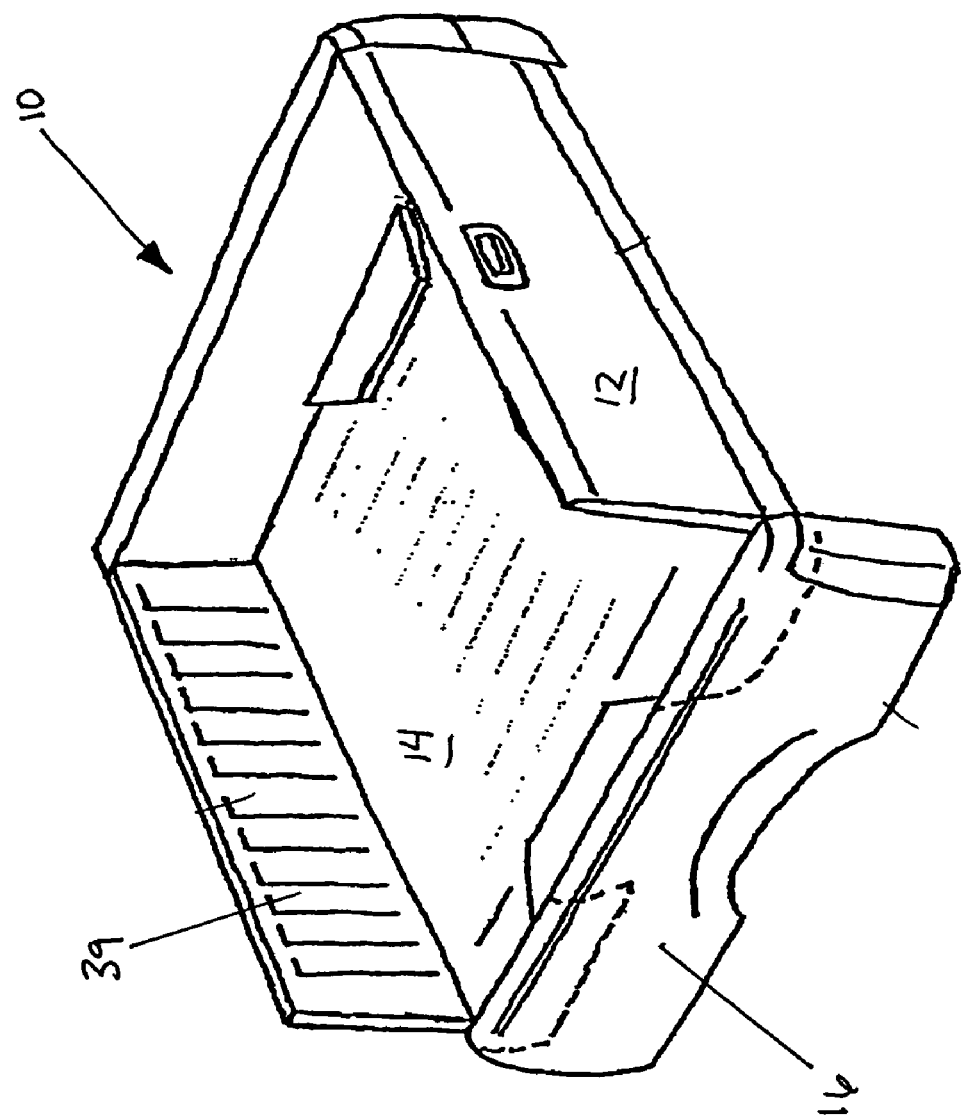
FIG. 8 illustrates a top perspective view of a cargo bed with a side member rolled into an open position according to one embodiment of the present invention.

FIGS. 8 and 9 illustrate top perspective and rear views respectively of the cargo bed 10 with the side member 16 slid into the open position according to one embodiment of the present invention. The side members 16 are configured to move perpendicular to the cargo floor 14. The side members 16 comprise a pivot member 66 rotatably connected on one end to the back member 39 and the front member 12 or the receiving beams 38 (See FIG. 4). An opposite end of the pivot member 66 attaches to the side member 16.

In operation, the pivot member 66 rotates to allow the side member 16 to move into the open and closed positions. The latch 48 attaches the side member 16 to the back member 39 and front member 12 or receiving beams 38. In one embodiment, the side members 16 move into the open and closed position using a mechanism similar to a sliding door on a vehicle, except the bed slide 16 moves vertically. One skilled in the art will recognize that there are numerous ways for moving the side member 16 into the open and closed positions.

FIG. 10 illustrates an exploded view of a cargo bed 10 according to one embodiment of the present invention. The side members 16 are configured to be removable from the cargo bed 10. Specifically, the side members 16 comprise posts 68 that protrude perpendicular to the side members 16. The posts 68 enter receiving holes 70 of the cargo floor 14. The posts 68 and receiving holes 70 may include a pin (not shown) and pin hole (not shown) to lock the posts 68 to the cargo floor 14. Other configurations of posts 68 and receiving holes 70 are envisioned. Specifically, the posts 68 and holes 70 may align perpendicular to the cargo floor 14. The receiving beams 38 may also be removable, as well as the front member 12.

It is understood that the above-described arrangements are only illustrative of the application of the principles of the present invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the description describes the folding, movement, or rotation of the side members 16, it is envisioned that portions of the side members 16, such as a two foot section of the side member 16, may be foldable, moveable, or rotatable, rather than the entire side member 16. Additionally, although the description describes the use of a pivoting means connecting the side members 16 to the cargo floor 14 or another member of the cargo bed 10, it is envisioned that the pivoting means may connect any part of the side member 16 to any part of the cargo bed 10, such that the side member 16 folds, moves, or rotates sufficiently to allow access to the cargo floor 14 from the sides of the cargo bed 10.

In addition, although the illustrations show a typical truck bed, it is envisioned that any type of cargo bed 10 may be used. Specifically, any type of cargo bed 10 that has sides that make movement of heavy awkward products difficult. The cargo bed 10 may be entirely flat like a flat bed trailer, or it may have wheel wells as illustrated.

It is further envisioned that the side members 16 may be configured with handles and latches similar to the handles and latches found on a typical front member.

Finally, it is envisioned that the principles taught herein may be applied to cargo beds 10 even after the cargo bed 10 has been attached to a vehicle. In particular, it is envisioned that the side members 16 of a typical cargo bed 10 may be cut and configured to be movable. For instance, a person may cut the side members 16, or portions thereof, from an existing cargo bed 10 without movable side members 16, attach hinges and/or pivot arms or pivot members to the cargo floor 14 and to the inner and outer sides 28, 30 of the side members 16, connect the side member 16 back onto the cargo floor 14, and perform common body repair, paint, and trim. In other embodiments, the receiving beams 38 may also be attached to the cargo floor 14.

Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts of the invention as set forth in the claims.

What is claimed is:

1. A cargo bed of a vehicle for transporting objects, comprising:

a cargo floor;

a back member substantially perpendicularly coupled to the cargo floor;

a front member substantially perpendicularly coupled to the cargo floor and opposite the back member, capable of being moved from a closed front position to an open front position; and two side members opposite each other and substantially perpendicular to the cargo floor, and wherein at least one of the side members is configured to be moved from between a closed side position and an open side position, wherein one of the two side members includes:

an outer side with a top and bottom edge; and an inner side with a top and bottom edge; wherein the top edge of the inner side movably connects to the top edge of the outer side, and the bottom edge of the inner side pivotally connects to the cargo floor, and wherein the bottom edge of the outer side is configured to rotate away from the inner side when the side member moves to the open position.

2. The cargo bed according to claim 1, wherein when the side member moves to the open position an inner side of the side member lays substantially parallel to the cargo floor.

3. The cargo bed according to claim 1, further comprising a plurality of receiving beams substantially perpendicularly attached to the cargo floor, and configured to couple the side members to the back member and the front member.

4. The cargo bed according to claim 1, further comprising a restraining member for preventing the outer side from rotating away from the inner side more than a predetermined distance.

5. The cargo bed according to claim 1, further comprising a latch configured to retain the side member in the closed position.

6. The cargo bed according to claim 1, wherein the front member and the back member each comprise receiving sections configured to receive the side sections and hold the side sections in the closed position.

7. A cargo bed of a vehicle for transporting objects, comprising:
- a cargo floor;
- a back member substantially perpendicularly coupled to the cargo floor;
- a front member substantially perpendicularly coupled to the cargo floor, opposite the back member, and configured to rotate about a horizontal axis with respect to the cargo floor;
- two side members opposite each other and substantially perpendicular to the cargo floor, and wherein at least one of the side members is configured to be moved between a closed position and an open position, wherein at least one of the side members includes:
  - an inner side; and
  - an outer side configured to rotate away from the inner side when the side member moves to the open position; and
- at least one side member receiving beam for each side member capable of moving, the side member receiving beam extending substantially perpendicular to the cargo floor, and configured to receive the side member and removably secure the side member in the closed position.

8. The cargo bed according to claim 7, wherein the side member moves about a horizontal axis with respect to the cargo floor.

* * * * *